United States Patent
Sharma

(10) Patent No.: US 9,940,279 B2
(45) Date of Patent: Apr. 10, 2018

(54) PROCESSOR APPARATUS WITH PROGRAMMABLE MULTI PORT SERIAL COMMUNICATION INTERCONNECTIONS

(71) Applicant: Viswa N. Sharma, Houston, TX (US)

(72) Inventor: Viswa N. Sharma, Houston, TX (US)

(73) Assignee: PSIMAST, INC., Fort Meyers, FL (US)

( * ) Notice: Subject to any disclaimer, the term of this patent is extended or adjusted under 35 U.S.C. 154(b) by 484 days.

(21) Appl. No.: 14/552,471

(22) Filed: Nov. 24, 2014

(65) Prior Publication Data

US 2016/0147689 A1    May 26, 2016

(51) Int. Cl.
| | |
|---|---|
| G06F 13/40 | (2006.01) |
| G06F 13/38 | (2006.01) |
| G06F 13/42 | (2006.01) |
| G06F 15/16 | (2006.01) |
| H04L 12/46 | (2006.01) |
| H04L 12/54 | (2013.01) |

(52) U.S. Cl.
CPC ........ *G06F 13/4022* (2013.01); *G06F 13/382* (2013.01); *G06F 13/4282* (2013.01); *G06F 15/16* (2013.01); *H04L 12/4625* (2013.01); *H04L 12/56* (2013.01)

(58) Field of Classification Search
CPC ............... G06F 13/382; G06F 13/4022; G06F 13/4282; G06F 15/16; H04L 12/4625; H04L 12/56
See application file for complete search history.

(56) References Cited

U.S. PATENT DOCUMENTS

| | | | | |
|---|---|---|---|---|
| 4,979,100 A | * | 12/1990 | Makris | .................... H04L 12/56 710/117 |
| 5,544,162 A | * | 8/1996 | Mraz | ................... H04L 12/4608 370/396 |
| 2005/0281282 A1 | * | 12/2005 | Gonzalez | .............. G06F 13/387 370/422 |

* cited by examiner

*Primary Examiner* — Eric Oberly

(57) ABSTRACT

A computing and communication chip architecture is provided wherein the interfaces of processor access to the memory chips are implemented as a high-speed packet switched serial interface as part of each chip. In one embodiment, the interface is accomplished through a gigabit Ethernet interface provided by protocol processor integrated as part of the chip. The protocol processor encapsulates the memory address and control information like Read, Write, number of successive bytes etc, as an Ethernet packet for communication among the processor and memory chips that are located on the same motherboard, or even on different circuit cards. In one embodiment, the communication over head of the Ethernet protocol is further reduced by using an enhanced Ethernet protocol with shortened data frames within a constrained neighborhood, and/or by utilizing a bit stream switch where direct connection paths can be established between elements that comprise the computing or communication architecture.

9 Claims, 16 Drawing Sheets

PROCESSOR APPARATUS WITH PROGRAMMABLE MULTI PORT SERIAL COMMUNICATION INTERCONNECTIONS

CROSS-REFERENCE TO RELATED APPLICATIONS

This application is a divisional application of U.S. patent application Ser. No. 13/543,882 filed, Jul. 8, 2012 which is a continuation of U.S. patent application Ser. No. 12/910,867 filed on Oct. 25, 2010 which is a continuation of U.S. patent application Ser. No. 12/025,720 filed 4 Feb. 2008 which claims priority of the provisional patent application Ser. No. 60/887,987 filed on Feb. 2, 2007.

FIELD OF THE INVENTION

The present invention relates generally to the field of computing and communication architectures, and more specifically to an architecture for processor and memory access using an integrated a high speed packet switched serial interface directly onto the same chip as the processor arrangement.

BACKGROUND OF THE INVENTION

The term computer architecture in a very broad sense connotes the interconnection of a core set of functional units that include a processing subsystem that executes instructions and acts upon data, a memory subsystem that cooperates with the processing subsystem to enable selected data and instructions to be stored and transferred between the two subsystems, and an input/output (I/O) subsystem that allows at least the processing subsystem to exchange data and instructions with the network and peripheral environment external to the computer. This core set of functional units can be configured into different computer system topologies using various communication interconnection arrangements that govern the interchange of communications between the functional units. For example, a processor and its memories can be locally coupled in a circuit card or it could be geographically spread over a system chassis via a back plane interconnection.

The Personal Computer (PC) represents the most successful and widely used computer architecture. Architecturally, not much has changed since the PC was first introduced in the 1980s. At its core, a typical PC is comprised of a single circuit board, referred to as a motherboard, that includes a microprocessor which acts as the central processing unit (CPU), a system memory and a local or system bus that provides the interconnection between the CPU chip and the system memory chips located on the motherboard and the I/O ports that are typically defined by connectors along an edge of the motherboard. One of the key reasons for the success of the PC architecture was the industry-standardized manner by which the components were interconnected.

A more recent example of a popular chassis-based computer architecture can be found in the area of high performance computing (HPC). One of the architectural innovations in the HPC area has been the adoption of server blade configuration where one or more blades—such as server blades, memory blades, I/O blades, PC blades are plugged into a common rack that is based on industry standards. Instead of putting all of the chips for a computer system on a single motherboard, the functional elements of the computer system are broken out into smaller circuit cards referred to as blades that are then coupled together by a backplane that routes the largest amounts of data among different blades. In most of these HPC blade configurations, the backplane fabric for the common rack has been implemented by a standardized parallel bus interconnection technology such as the PCI bus. Breaking out the functional components onto blades permits more flexibility in terms of configurations of components, while the use of a standardized interconnection such as the PCI bus permits blades from different providers to be configured together in the same common rack. Like the successful PC architecture, the use of a standardized local or system bus interface such as the PCI bus has been critical to the success of the blade architecture for HPC and server computer systems.

One of the parameters that have a significant impact on the system performance and implementation is the memory access method used by processors. There are two fundamental architectures to access memory. One of the architectures is the Von Neumann architecture wherein one shared memory is used to store instructions (program) and data with one data bus and one address bus between processor and memory. This architecture requires instructions and data be fetched sequentially introducing a limitation in operation bandwidth which is often termed the "Von Neuman Bottleneck". The second architecture to access memory is referred to as the Harvard architecture which uses physically separate memories and dedicated buses for their instructions and data. Instructions and operands can therefore be fetched simultaneously. Both architectures involve a bus or buses to transfer information between the processor and memory. It will be appreciated by those skilled in the art that regardless of the processor and memory speeds, the speed of information transfer between the processor and memory can substantially impact the performance of the computer system.

While there have been significant strides with respect to the available CPU power, memory capacity, and memory speeds for the individual components of a computer system, progress in processor-memory interconnections and memory access in terms of the speed of the local or system parallel bus has lagged far behind. Processors and memories that can operate at upwards of 3 GHz clock are known, but local system buses that can operate as a parallel bus interconnection at speeds that match the processor speeds are very rare as such high speed buses are difficult to implement. For example, the system bus, referred to as the front side bus, that is used to externally interface to a Pentium 4 microprocessor chip operates slower than the speed of the processor. Conventionally, I/O devices external to the motherboard communicate over a slow speed I/O bus, such as the Peripheral Component Interconnect (PCI) Bus, that is connected to a chipset on the motherboard, referred to as a bridge, which in turn communicates with the CPU over the front side bus. While this approach has worked well when I/O devices communicate at speeds that are much slower than the speeds of processors and main memory, current developments in I/O technologies, such as Infiniband and Multi Gigabit Ethernet, can deliver I/O communications at rates approaching upwards of several gigabits per second. These developments have blurred the conventional distinctions between CPU-memory and CPU-I/P transactions and negated the rationale for relegating I/O communications to a separate, slower legacy I/O bus such as the PCI bus.

One of the challenges in attempting to increase the speed of I/O buses, such as the PCI bus and PCI Extended (PCI X) bus, is that a parallel bus arrangement is prone to problems of clock skew between data flowing in the separate parallel data paths that may, for example, differ from each other by a very small path length. Clock recovery and data reconstruction prove to be increasingly problematic and unreliable as path lengths, data transfer speeds and/or the number of parallel paths are increased. Additionally, parallel buses take up considerable circuit board real estate.

Prior art solutions to the problems posed by increasing speeds on parallel buses for both front side buses and I/O buses have involved, for the most part, the use of proprietary protocols that are specific to a given provider of microprocessor chips and chipsets. For example, an advanced version of the front side bus on the Athelon 64/FX/Opteron, by Advanced Micro Devices, can operate at speeds approaching 1 Ghz for a theoretical bandwidth of 14400 MB/s for a parallel bus that is 32 bits wide. Unfortunately, this is a proprietary solution that is incompatible with the general trend of migrating to the adoption of industry wide standards that encourage vendors to develop products which are interoperable with other vendors' solutions so as to reduce time and cost to market for new products.

The problem created by this divergence between processor speeds and memory access speeds is well known and has been referred to in the prior art as the memory gap or memory wall problem. See, e.g., Cuppa et al., "Organizational Design Trade-Offs at the DRAM, Memory Bus and Memory Controller Level: Initial Results", *University of Maryland Systems & Computer Architecture Group Technical Report* UMD-SCA-1999-2, November 1999. The memory gap problem is further compounded by the need to address a large memory capacity. One solution employed in the prior art to overcome the memory wall/memory gap problem is to eliminate the parallel bus interface between the processor and memory and use a serial backplane interface instead of a parallel bus like the PCI bus.

One early attempt to establish a standardized serial backplane interface between processors and memories was the Scalable Coherent Interface. Gustayson, D. and Li, Q., "The Scalable Coherent Interface (SCI)". *IEEE Communications* (August 1996). Unfortunately, this proposal was not widely adopted.

More recently, proprietary high-speed serial interfaces between processors and memory have been developed by chip manufacturers, such as the AMD® HyperTransport and the Intel® Fully buffered Dimm (FB DIMM). Other alternatives have been proposed in the form serial chip-to-chip interfaces such as described by Trynosky, "Serial Backplane Interface to a Shared Memory," Application Note: Virtex-II Pro FPGA Family, XILINX, Nov. 30, 2004 or and multiple single byte serial processor to memory interfaces as described by Davis, "The Memory Channel," Summit Computer Systems, Inc. Sep. 19, 2004.

The migration from parallel to serial interfaces among components in a computing architecture is not unique to the processor/memory interface. Serial interfaces have also become the standard for almost all I/O communication channels, including back planes. Advanced Switching Interconnect (ASI) switching fabrics that utilizes hierarchies and multiple high speed clocked serial data lanes channels or proprietary packet switched DMA techniques as described, for example, in U.S. Pat. No. 6,766,383. Industry standard I/O protocols, such as Infiniband, Fibre Channel and Gigabit Ethernet, can deliver I/O communications at rates approaching upwards of several gigabits per second.

While the speeds of a serial I/O protocol theoretically could approach the speeds needed for the processor/memory interface, the communication overhead associated with serial I/O protocols has curtailed any serious attempts to consider using serial I/O protocols as a basis for a processor/memory interface. Serial I/O communication protocols generally have larger packet and address sizes that are better suited for accessing large amounts of data stored on disk or over a network. The larger packet and address sizes results in an increased communication overhead penalty. The processor/memory interface conventionally has required the ability to transfer data between the processor and memory for a single address location, a requirement for which the overhead of I/O transfers and protocols has been seen as massive overkill In addition, there are many more transmission blocking and memory contention concerns that need to be addressed for I/O communications than for processor-to-memory interfaces.

Some alternatives that utilize a serial I/O interface protocol for backplane connections instead of parallel bus interconnection technologies have been proposed. U.S. Publ. Appl. No. 20050091304 discloses a control system for a telecommunication portal that includes a modular chassis having an Ethernet backplane and a platform management bus which houses at least one application module, at least one functional module, and a portal executive. In this patent application, a 1000BaseT (Gigabit Ethernet) backplane provides a packet-switched network wherein each of the connected modules acts as an individual node on a network in contrast to a conventional parallel bus connection such as a PCI bus.

U.S. Publ. Appl. No. 20060123021 discloses a hierarchical packaging arrangement for electronic equipment that utilizes an Advanced Telecommunication Computing Architecture (TCA) arrangement of daughter boards in the for an Advanced Mezzanine Card (AMC) that are interconnected with a hierarchical packet-based interconnection fabric such as Ethernet, RapidIO, PCI Express or Infiniband. In this arrangement, the AMCs in each local cube are connected in a hierarchical configuration by a first, lower speed interface such a Gigabit Ethernet for connections within the local cube and by a second, higher speed interface such as 10 G Ethernet for connections among cubes.

The problems of Ethernet switched backplane architectures in terms of latency, flow control, congestion management and quality of service are well known and described, for example, by Lee, "Computation and Communication Systems Need Advanced Switching," *Embedded Intel Solutions*, Winter 2005. These issues have generally discouraged the adoption of serial I/O protocols for communications between processors and memory even as such serial I/O protocols are being used in the smaller physical dimensions of a circuit board or a computer or communication rack or cabinet having multiple cards/blades interconnected by a backplane. Instead, the trend has been to increase the capacity of individual chips and the physical size of each of the server blades in order to accommodate more processors and memory on a single chip or circuit board, thereby reducing the need for processor and memory interconnection that must be mediated across the backplane.

As processor speeds, memory speeds and network speeds continue to increase, and as the external I/O is increasingly capable of delivering data at rates exceeding gigabit speeds, the current architectures for arranging the subsystems within a computing and communication architecture are no longer efficient. The problem of memory access like the Von Newman and Harvard architectures, in the light of multiple processor cores with in a chip further aggravates the processor and memory interconnect technology. There is therefore a need for a computing and communication chip architecture that is not constrained by the current architectural limitations and can provide a solution that is compatible with industry configuration standards and is scalable to match the speed, capacity and processing core requirements of a converged computing environment of the next generation computers and communications equipment.

SUMMARY OF THE INVENTION

The present invention is directed to a computing and communication chip architecture wherein the off-chip interfaces of processor and memory chips are implemented as a high-speed packet switched serial interfaces as part of each chip in a semiconductor package. In one embodiment, the high-speed packet switched serial interface is a gigabit Ethernet interface implemented by a packet processor co-located with at least one processor core within the chip package. The serial interface is configured to transfer data, address and control information, required to fetch and write data from and to an external memory device such as a system main memory using a serial packetized protocol. Communications between at least one processor and the external memory device may be mediated by at least one bridge device capable of translating between multiple serialized protocols and optionally a switch device adapted to mediate communications between on-chip entities such as processor cores, caches, and the packet processor, as well as the communications between on-chip entities and off-chip devices such as the system main memory.

In an exemplary embodiment, the packet processor is implemented as a on the fly programmable bit stream protocol processor integrated as part of the chip. In one embodiment, a processor chip with cache can connect to a system or main memory chipset via a bit stream protocol processor incorporated as part of the microprocessor chip. In one embodiment the processor serial interface can be a 10 Giga bit Ethernet interface. In these embodiments, the protocol processor encapsulates the memory address and control information like Read, Write, number of successive bytes etc, as an Ethernet packet for communication among the processor(s) and memory chips that are located on the same chip, or on the motherboard, or alternatively on different circuit cards. In one embodiment, the communication overhead of the Ethernet protocol is further reduced by using an enhanced Ethernet protocol with shortened data frames within a constrained neighborhood, and/or by utilizing a bit stream switch where direct connection paths can be established between elements that comprise the computing or communication architecture.

The above summary of the various embodiments of the invention is not intended to describe each illustrated embodiment or every implementation of the invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
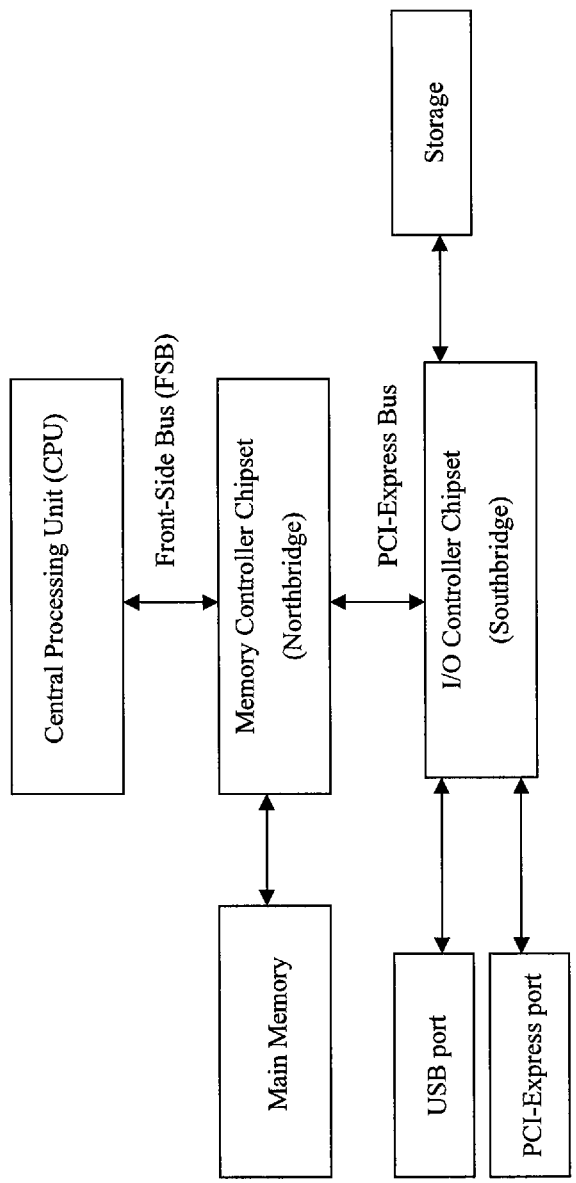
FIGS. 1A, 1B, 1C, 1D, and 1E illustrate various configurations of front side bus arrangements for prior art processor chipset architectures.
Figure 1B:
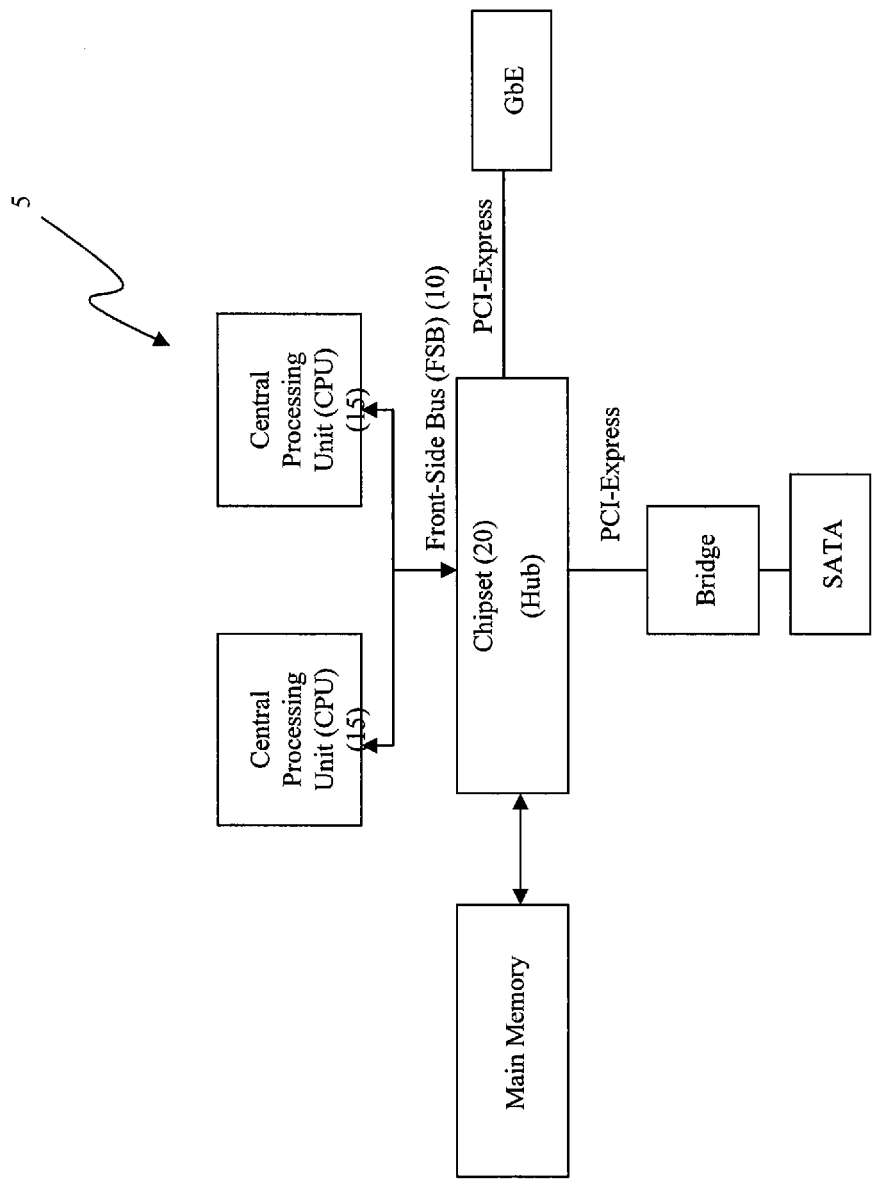
Figure 1C:
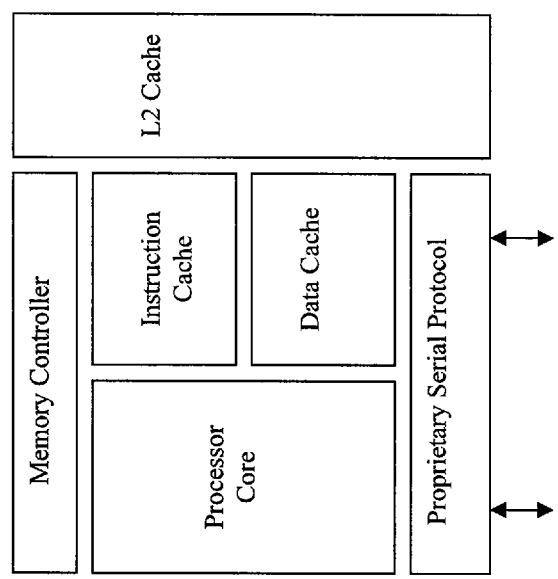

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIGS. 1A, 1B, 1C, 1D, and 1E illustrate various configurations of front side bus (alternately "Channel") arrangements for prior art processor chipset architectures. In each of these configurations, a clocked bus interface 10 is used between the processor chip 15 and one or more support chips 20 for purposes of routing data and instructions among the various elements of the computer architecture 5.

Figure 1D:
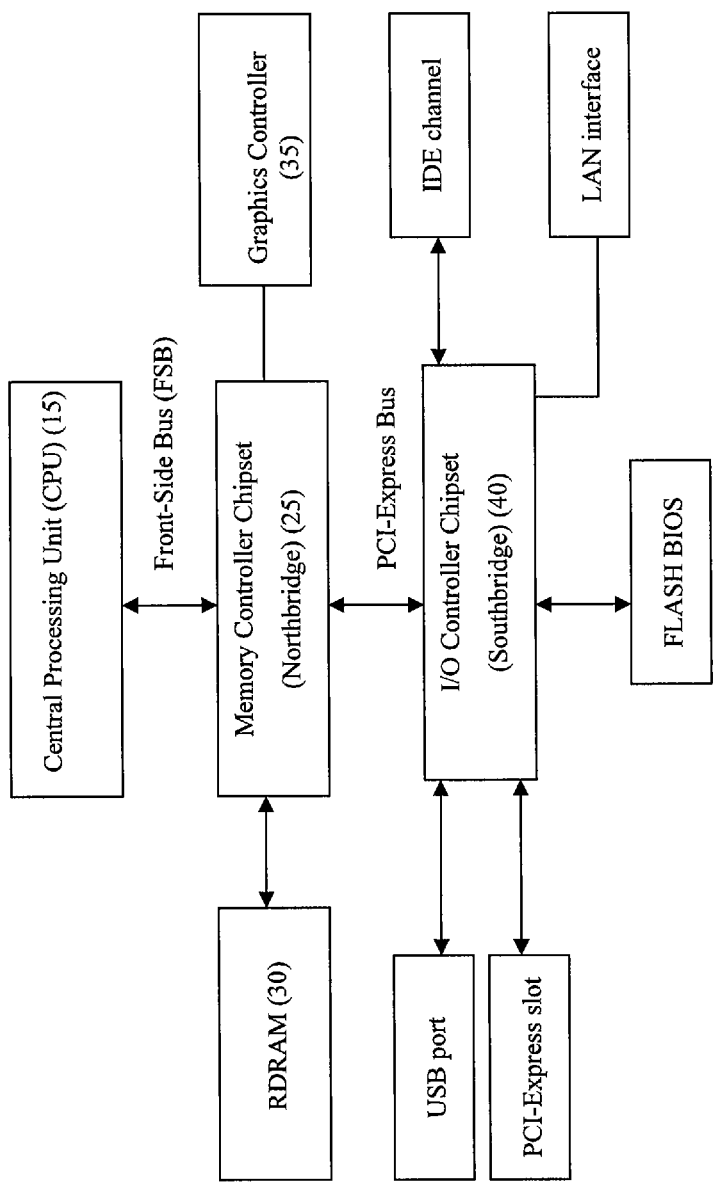

Conventional architectures feature a channel, variously referred to as the Front Side Bus ("FSB"), the Processor Side Bus, the Memory Bus, the Data Bus, or the System Bus, over which the CPU communicates with, for example, a motherboard chipset such as the Northbridge and Southbridge controllers illustrated, for example, in FIG. 1D. The Northbridge 25 interconnects the CPU 15 to the RAM memory 30 via the FSB. The Northbridge also connects peripherals such as the graphics card 35 via high speed channels such as the AGP and the PCI Express. The Southbridge controller 40 handles I/O including hard drives, USB, serial and parallel ports and external storage devices via other channels running communication protocols such as Ethernet and PCI Express.

Figure 1E:
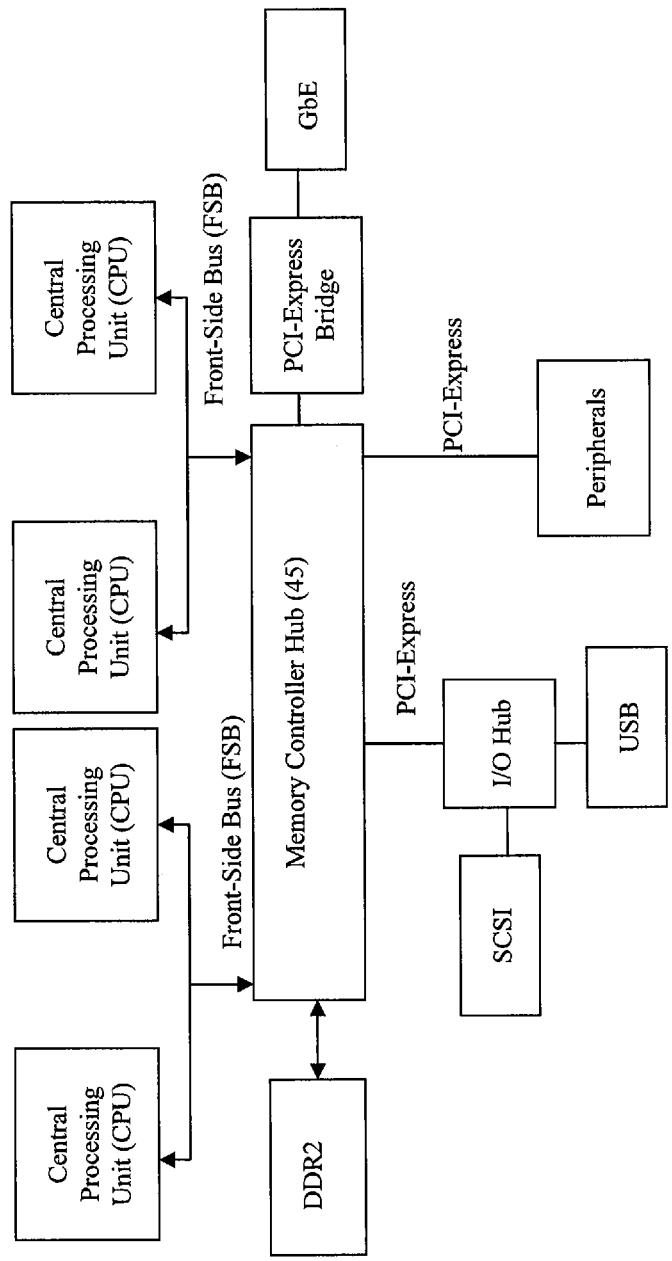

Currently, most front-side bus (FSB) speeds cannot deliver the performance required of telecommunication and computing applications designed to comply with contemporary industry wide standards. For example, the PICMG® Advanced Mezzanine Card (AMC) specification defines the base-level requirements for a wide range of next generation high-speed mezzanine cards. For example, the AMC card interconnect is specified at 12.5 Gbps per differential pair. Xilinx operates at 8 Gbps and Fujitsu offers a 10-Gigabit Ethernet Switch. In comparison, the Intel Itanium 2 processor front-side bus (FSB) speed is approximately 667 MHz, the AMD Opteron™ Front Side Bus frequency is approximately 1.4-2.8 GHz, and the Intel Hub Architecture (IHA), which substitutes the Memory Controller and the I/O Controller for the Northbridge and Southbridge controllers, features a system bus between the CPU and the Memory Controller that is capable of operating at speeds of 400 GHz, . . . even though the dual RDRAM operate through the Memory Controller Hub (MCH) 25, to deliver a memory bandwidth of 3.2 GB/s as illustrated in FIG. 1D. FIG. 1E illustrates the IHA based multiprocessor architecture known to the art.

One skilled in the art will appreciate that communication over the FSB and through the memory controller hub 45 of FIG. 1E, for example, introduces latency in RAM memory read operations. Furthermore, the RAM memory access and I/O share the FSB bandwidth which can further degrade performance of the FSB. Clearly, the telecommunication and high performance computing applications designed to conform to the aforementioned industry specifications require an architecture that is faster than the performance limits of the aforementioned interconnects and is capable of operation under a wide range of industry standard protocols such as Ethernet and PCI Express.

Figure 2A:
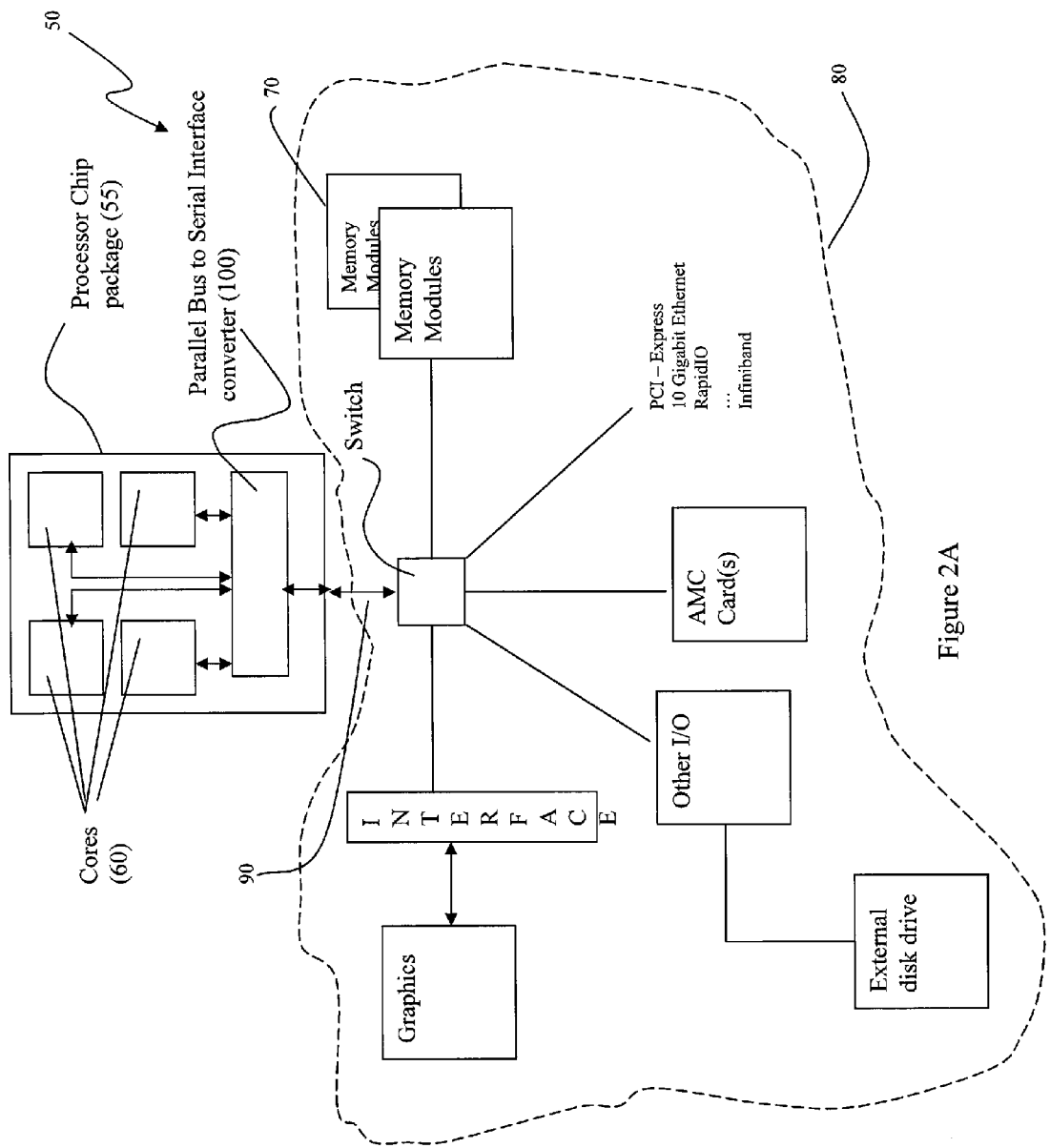
FIG. 2A depicts a chip architecture according to one aspect of the present invention wherein the processor chip package communicates externally via at least one serial line extending from a packet processor based parallel bus to serial interface converter located on the die.
Figure 2B:
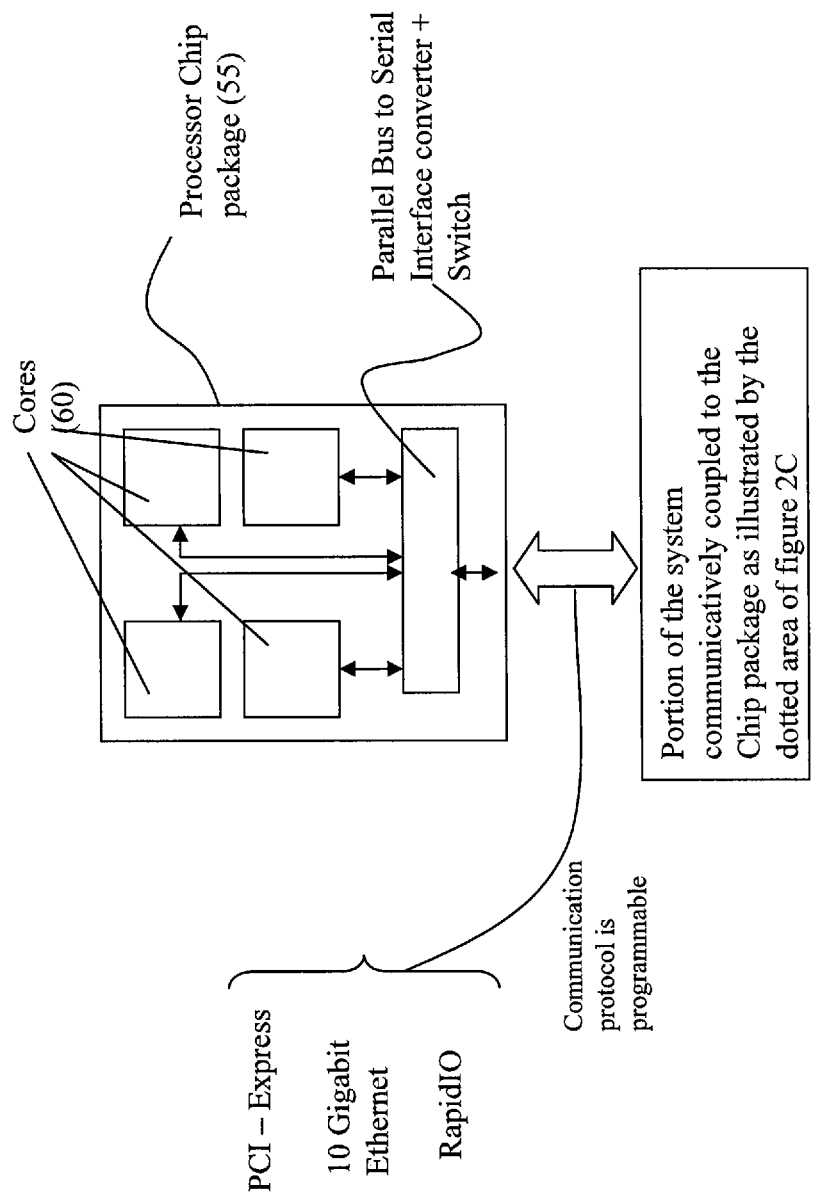
FIG. 2B is a block diagram representation of a multi-core processor chip package according to one embodiment of the present invention that is communicatively coupled to the devices external to the chip via at least one programmable serial interconnect extending from a switch and a parallel bus to serial interface module located within the chip package.
Figure 2C:
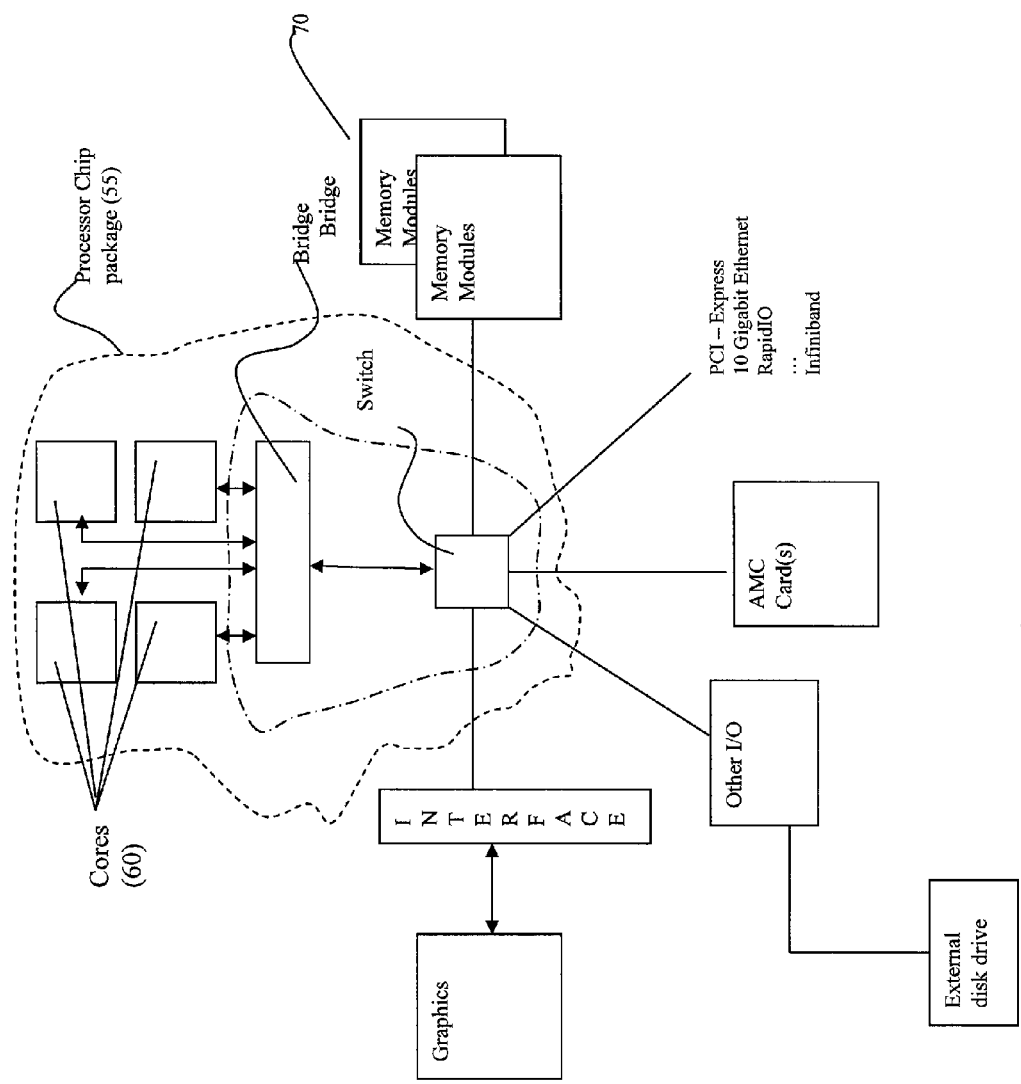
FIG. 2C is a block diagram representation of a multi-core processor chip package according to one embodiment of the present invention that is communicatively coupled to the devices external to the chip via at least one serial line extending from a module located within the package and adapted to function as a combination switch and a parallel bus to serial interface.
Figure 2D:
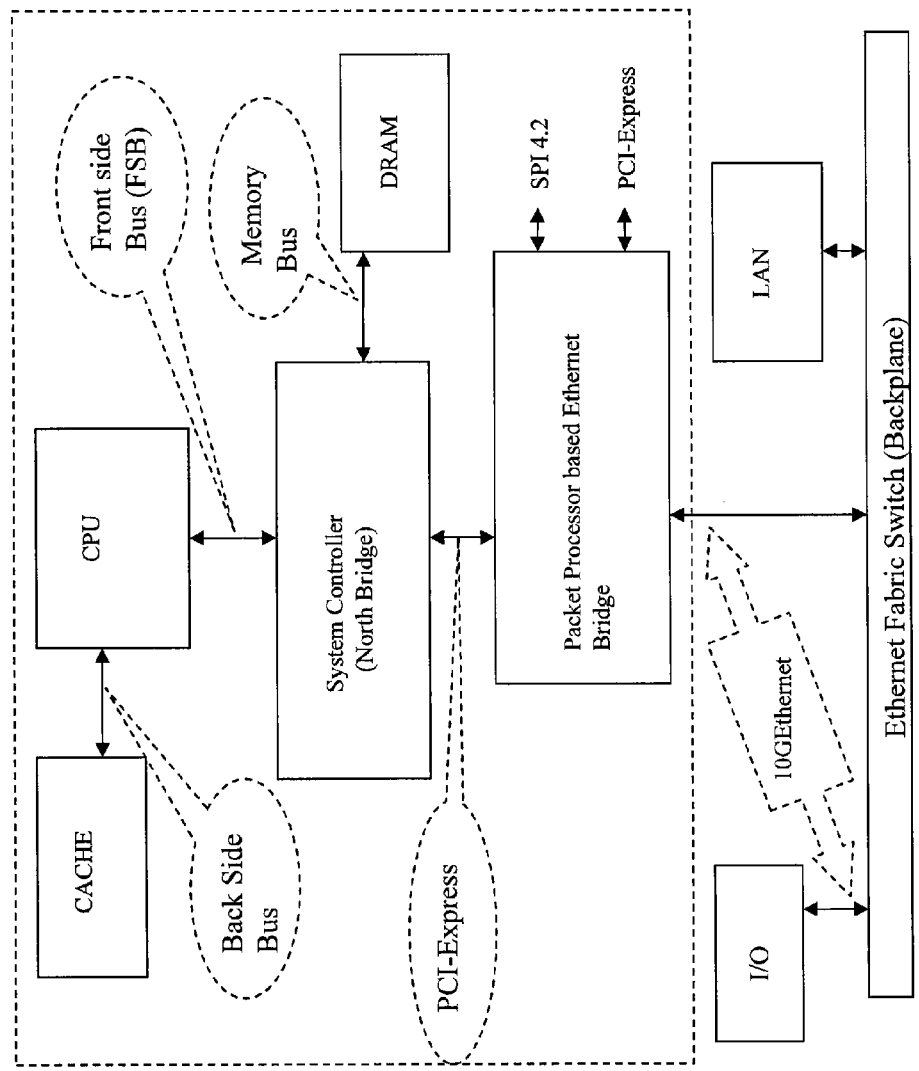
FIG. 2D is a block diagram representation of a packet processor based Ethernet bridge that provides protocol translation and the serves as a "Southbridge" in a processor chip that features a unified computing, backplane, and network architecture.
Figure 5A:
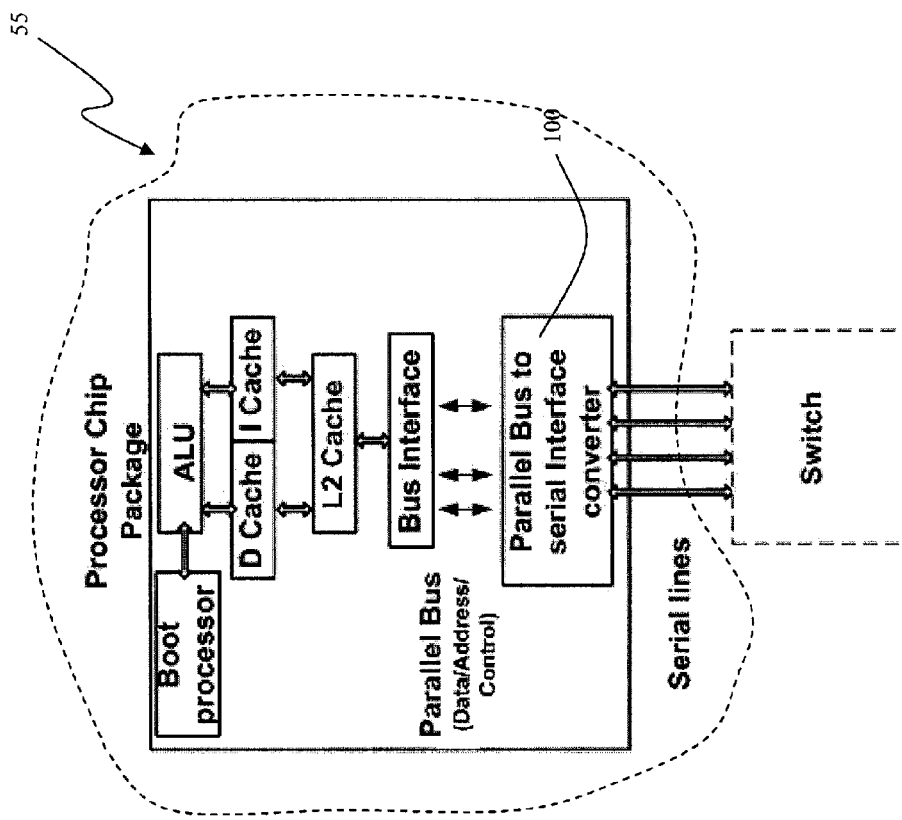
FIG. 5A is a block diagram of a processor chip package containing a single processor "core" that communicated externally via at least one serial line according to one embodiment of the present invention
Figure 5B:
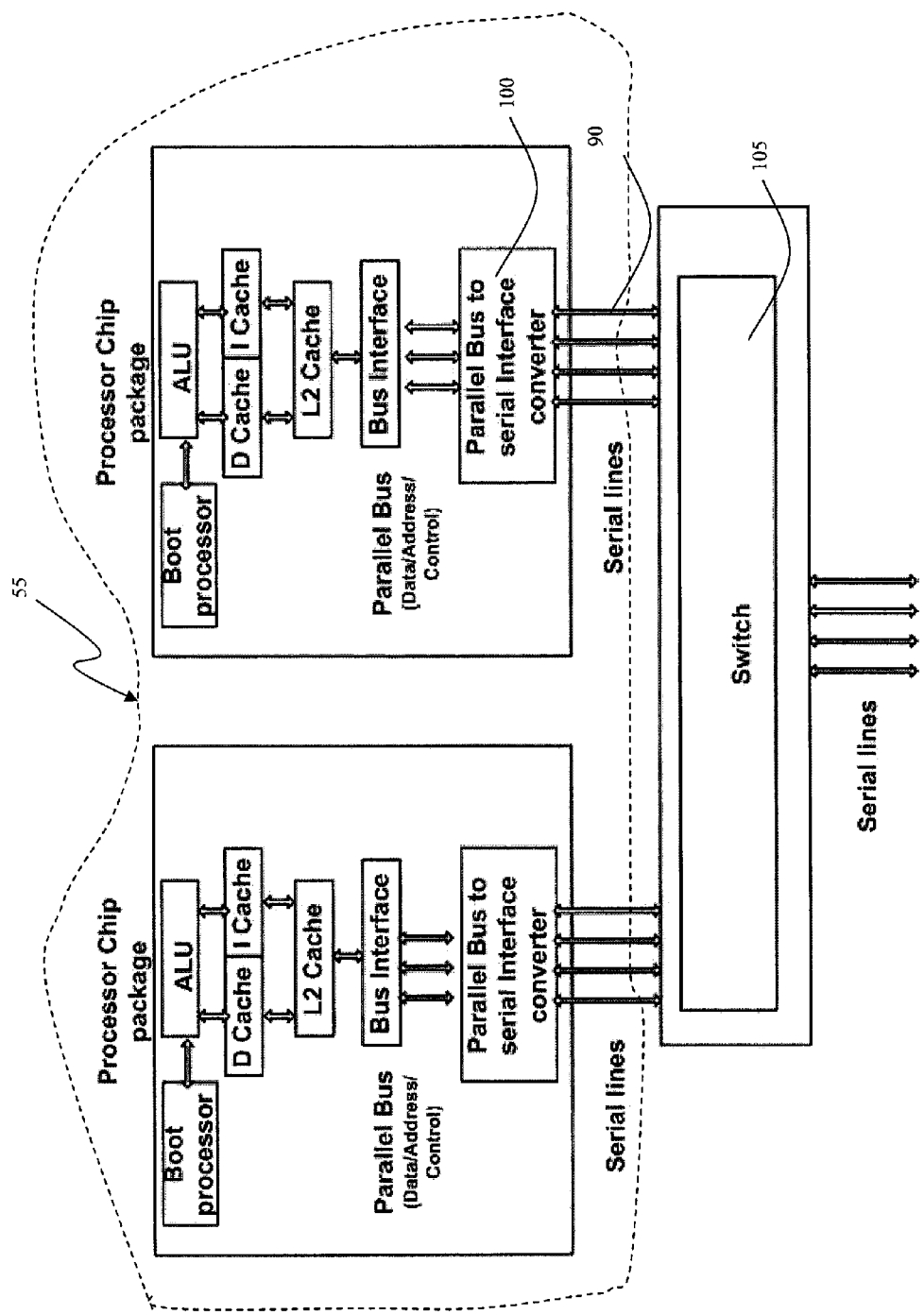
FIG. 5B is a block diagram of a processor chip package containing multiple processor "cores" each of which is placed in serial communication with a port on an external switch that in turn communicates with devices external to the chip package.
Figure 5C:
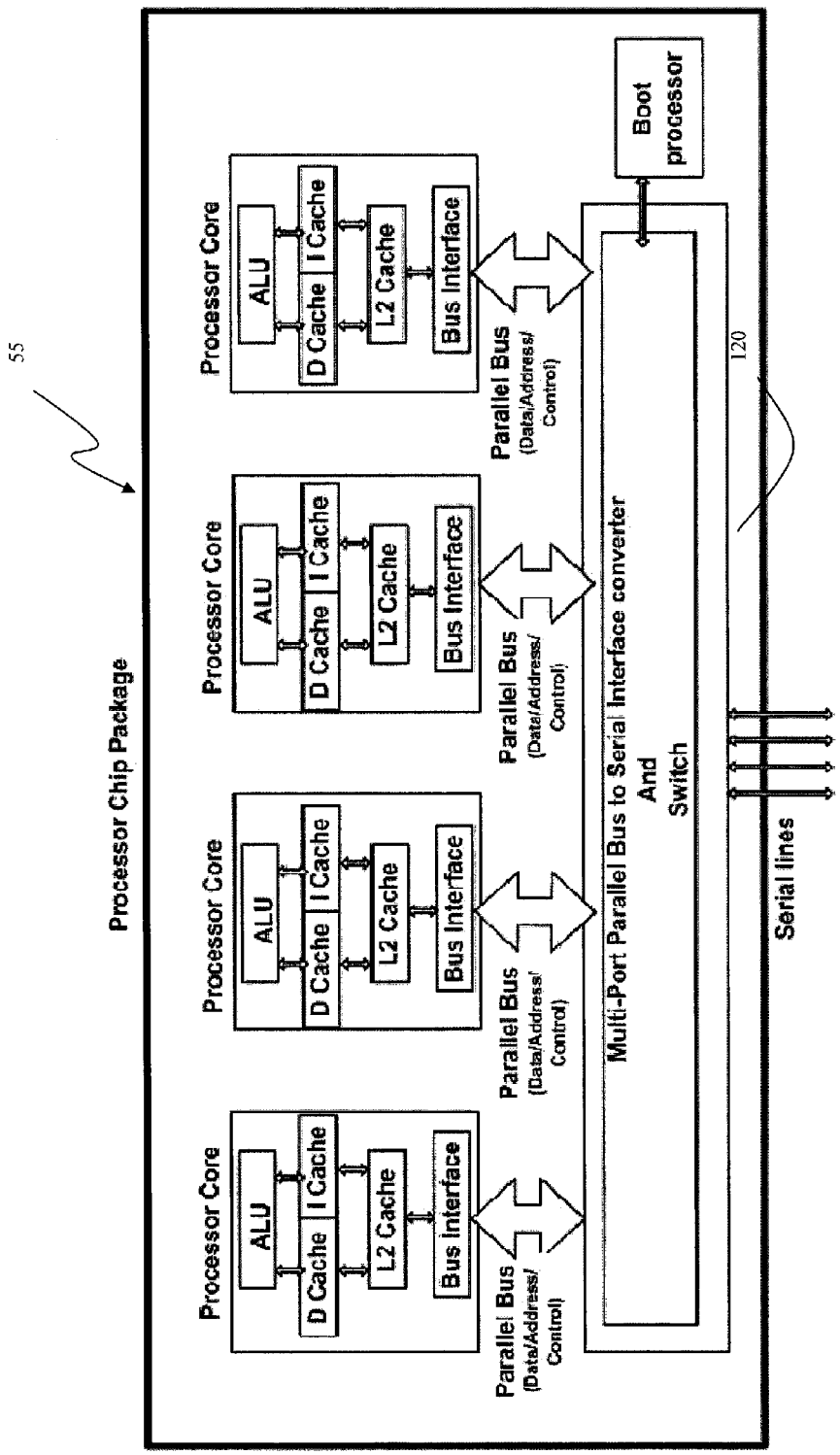
FIG. 5C is a block diagram of a processor chip package containing multiple processor "cores" each of which communicates with a multi-port parallel bus to serial interface converter contained within the chip package and placed in serial communication with devices external to the chip package via at least one serial line.

Referring to FIGS. 2A-2C, there is illustrated a multi-core processor architecture 50 according to a primary embodiment of the present invention. One aspect of the illustrated multi-core processor architecture 50 takes the form of a single physical package 55 (alternately "Processor Chip Package") that is received into a single processor socket (not illustrated). This single physical package 55 includes a plurality of execution cores (alternatively, computational engines, or processing engines) 60 but an external operating system perceives the package as a single processor. In one embodiment, the core 60 can be pin compatible with existing processor sockets. Each execution core 60 includes its own processor-specific functional blocks such as, for example, caches, arithmetic logic units (ALU)s, priority interrupt controller, architectural registers, pipeline prediction mechanisms, and instruction set as seen in the illustrations of FIGS. 5A-5C. Each execution core is capable of independently executing program instructions and a plurality of threads under the direction of the external operating system. In associated embodiments, the cores can execute internal and/or external instructions in cooperation with the remaining core or cores in the package, an operating system can differentiate between the services provided by each of the cores and the cores can access shared resources such as cache and external system memory 70 as seen in FIGS. 2A and 2C for example. In other embodiments, the operating system may be capable of supporting parallel execution among multiple cores and each core, or various combinations of cores, can be seen by the operating system as separate parallel processing units.

It will be appreciated that the present invention is not limited by any particular core or number of cores that might reside within a single physical package 55. In particular, the execution cores can be one or more of the Smithfield core used in Intel's 90 nanometer Pentium D's and Pentium Extreme Edition 840, the Presler core used in Intel's 65 nanometer Pentium Extreme Edition 955 processor, AMD's 90 nanometer Egypt and Denmark cores. Other cores can be used within the scope of the present invention.

An important feature of the present invention is that data-communication between the processor 55 and the system devices 80 occur via at least one serial interconnect 90 mediated by a bridge-architecture 100 that in at least one embodiment communicates with a switch-architecture 105 as seen in FIG. 5C for example. The switch-architecture 5C is the gateway via which the rest of the devices 80 in the system and the processor communicate. In one embodiment, the bridge-architecture 100 and optionally the switch-architecture 105 (alternately collectively "Parallel bus to serial interface converter") are located on the processor die in an integrated configuration as illustrated in FIG. 2C. In such cases, one or more of the bridge-architecture and switch-architecture may be implemented in the form of additional core or cores on the die. Exemplary embodiments of the processor die configurations are illustrated in FIGS. 5A-5C. In another configuration, the switch may be located outside the die as illustrated in FIGS. 2A, 2B, 5A and 5B. One of skill in the art will readily recognize that all such configurations of the bridge-architecture and switch-architecture are included within the scope of the present invention. It must be emphasized that although the aforementioned embodiments are described for a multi-core architecture, the disclosed invention is equally applicable to the case where the processor package includes only one core (single processor) and to the case where the bridge-architecture and the switch-architecture is a single module, such as the parallel bus to serial interface converter 120 in FIGS. 2C and 5C for example.

Figure 3A:
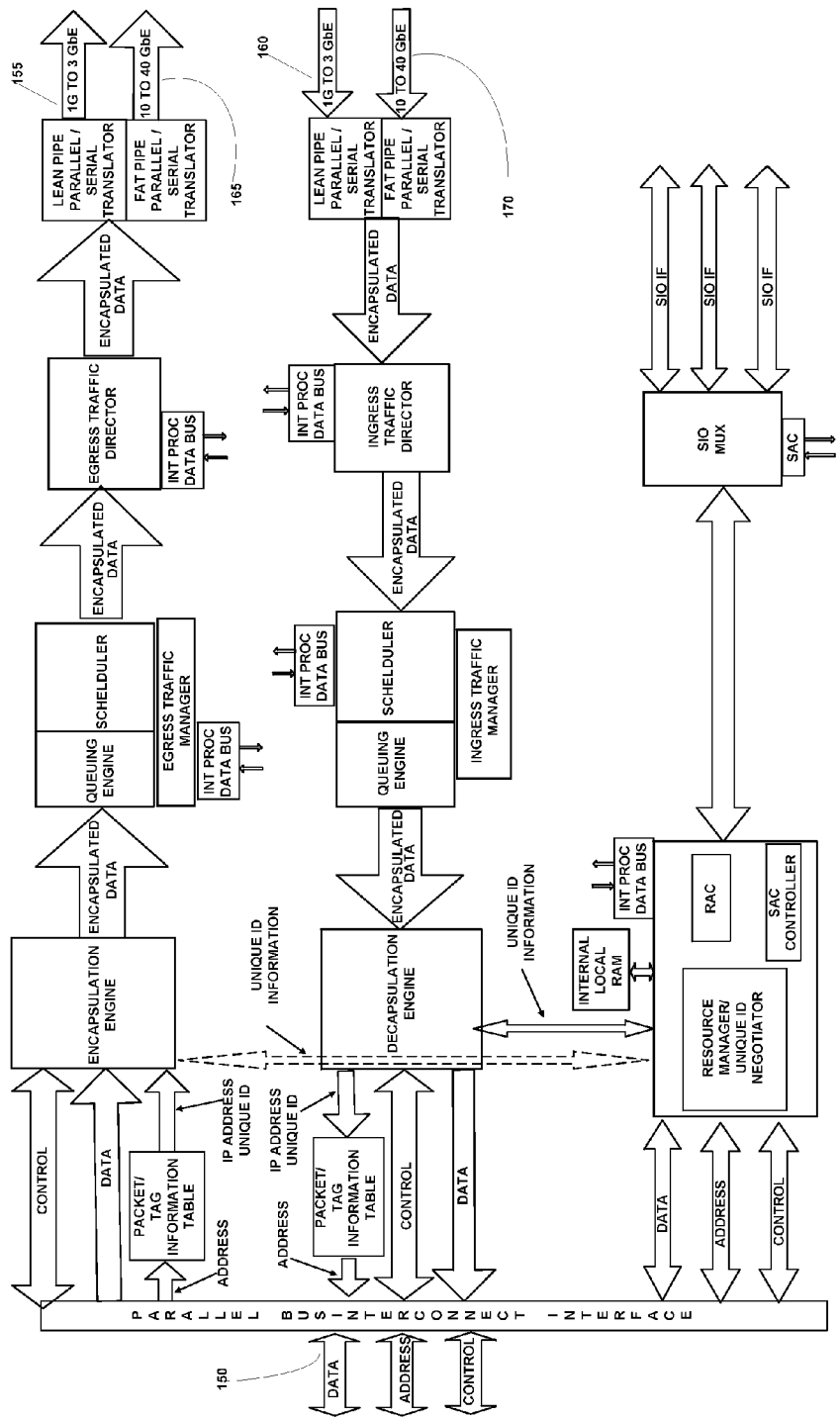
FIG. 3A illustrates a more detailed block diagram of a packet processor based parallel bus to serial interface converter that incorporates a token based, point-to-point communication in Ethernet between communications generating and consuming nodes in the system in accordance with one embodiment of the present invention.
Figure 3B:
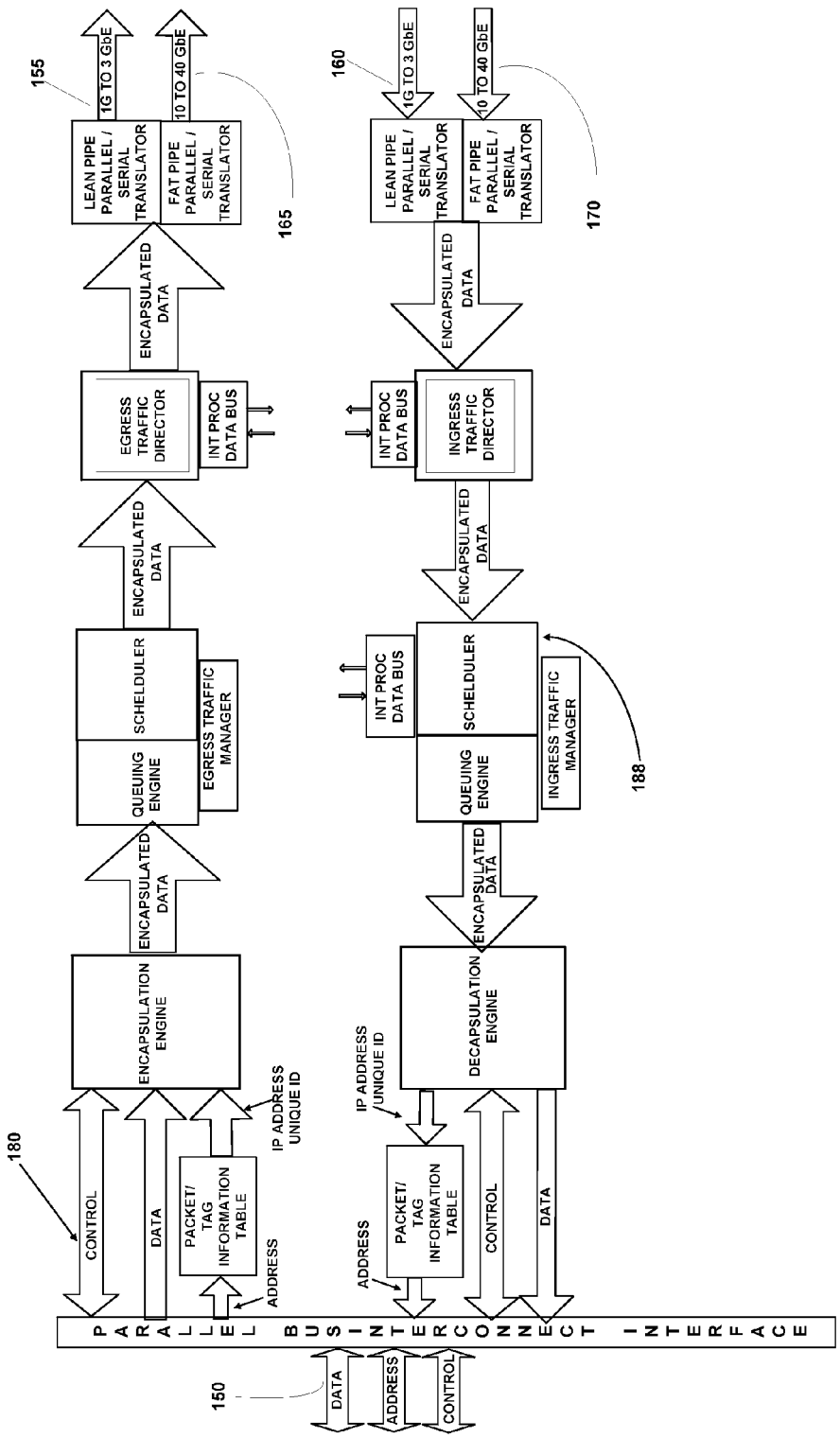
FIG. 3B illustrates a detailed block diagram of a packet processor based parallel bus to a serial interface that converts to and from parallel bus communications and serial packetized communications based on a pre-defined serial packet protocol in accordance with one embodiment of the present invention.
Figure 3C:
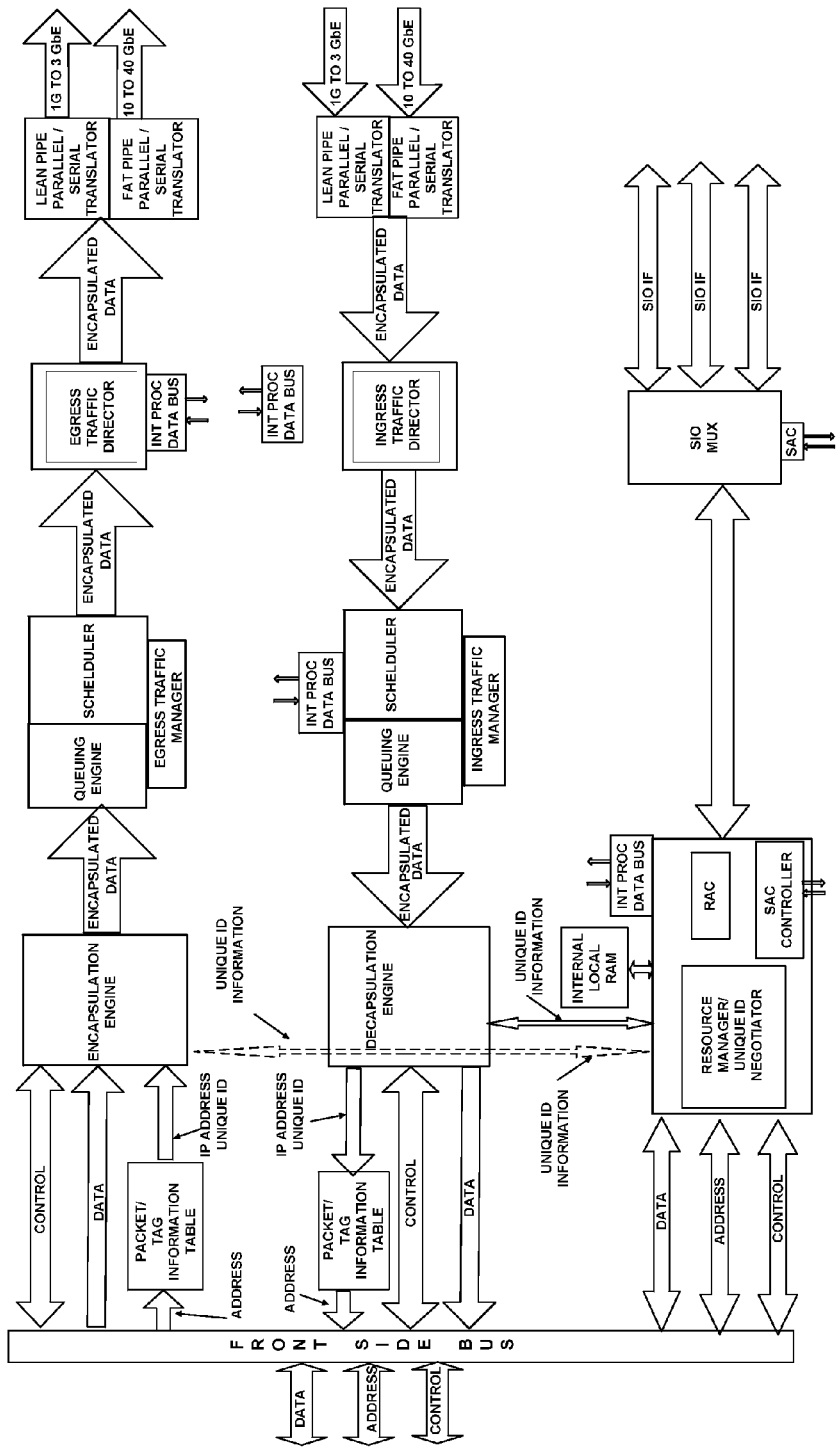
FIG. 3C is a schematic representation of a packet processor based parallel bus to serial interface converter in which the serial packet protocol output from the converter is programmable.

In one embodiment, the bridge-architecture is implemented using a packet processor architecture as shown in FIG. 3A-3C. FIG. 3B is a specific embodiment of a typical packet processor according to the present invention. Communications from the processor transferred over a parallel bus 150, such as the data, address and control information related to a "write" command to external system memory issued by a processor core 60 in an exemplary processor chip package 55, is processed by the packet processor portion 180 to generate serial packetized communications 155 (165) that are transferred via one or more serial lines 90 outside the chip package 55. Serial communications 160 (170) received from outside the chip package 55 are processed by the packet processor portion 188 into parallel communications transferred over parallel bus 150 to the processor as exemplified in FIGS. 3A and 3B. It will be appreciated that the serial-to-parallel transformations may be applied to communications between processor cores within the chip package, processor-core and external devices including other chip packages and I/O devices within the scope of the present invention. The functional blocks of FIGS. 3A and 3B may be adapted according to a bitstream processor (BSP) architecture illustrated in FIG. 3C for instance. The Bitstream processor is an on the fly programmable integrated packet processor, security engine and traffic manager using high performance pipelined packet switching architecture. The Bitstream processor may be physically implemented as an additional "core", integrated with other logic devices on the processor die or on a stand-alone chip while remaining within the scope of the present invention.

In one embodiment of the present invention, the Bit Stream processor performs a forward and reverse bridging function using a programmable pipelined architecture that provides high degree of flexibility for adaptation to legacy, existing and emerging board-level and network-level data communication/signaling protocols. Each stage/block within the pipeline has specific functions or responsibilities that make available any relevant information to the subsequent blocks. As a consequence, the architecture for each stage is different and is optimized to handle a given function. Each stage can be dynamically programmed on a packet by packet basis while the processor cores transfer data/instructions by sending several bits at one time over a parallel communications link. The intra-core data/instructions use signaling that is native to the processor-core and the associated system bus characterizing a vendor-specific CPU architecture such as for example, signaling compatible with the front side bus by Intel, the hyper transport technology based interconnect protocol by AMD or other proprietary/non-proprietary bus protocols. The Bit Stream processor bridges between the intra-processor protocol and one of a set of board-level or network level serial communication protocols. Upstream information transfers to the processor from the bridge are parallelized, formatted and clocked so that they represent the native signaling used by the processor cores. Responses from the cores (i. e. the downstream information transfers) such as for example, the memory requests or other system requests, are serialized and packetized by the Bitstream processor.

In one embodiment the Bitstream processor that processes the packets takes the form as described in more detail in the previously identified co-pending application entitled "Omni-Protocol Engine for Reconfigurable Bit-Stream Processing in High-Speed Networks." The packet processing by the Bitstream processor causes the packets to be bridged to a desired board level or network level protocol/bus-architectures and forwarded to the switch-architecture. Exemplary protocols include, without limitation, PCI-Express, 10 Gigabit Ethernet, Infiniband, Advanced Switching, RapidIO, SPI 4.2, XAUI and Serial I/O. Other protocols may be advantageously used without limiting the scope of the present invention.

An alternate embodiment of the present invention, illustrated in FIGS. 5A and 5B, contemplates an arrangement of the processor and bridge wherein the packet processor enables on-die connections for each of the plurality of protocols via separate ports comprised by one or more processor pins. Each port is configured to provide serial input/output to the processor in accordance with a specific pre-defined protocol.

In another related embodiment, the Bitstream processor is programmable to allow software based programming of the protocols characterizing communications at any particular serial interconnect or port. Each of the cores can be specialized to be application specific—such as packet processing for telecommunications, graphics engine functionality for gaming, and parallel computations for high performance computing. The Bitstream processor can be programmed to assign all traffic associated with a particular core to a specified port. In another embodiment of the present invention the aforementioned port can couple to an Advanced Mezzanine Card (AMC) module and provide processor support to the module where applicable or provide all or part of the Module Management Controller (MMC) functionality in an AdvancedTCA® (ATCA) based open modular system architecture.

Referring again to FIG. 2C, there is shown a block diagram representation of another feature of the present invention. As seen in FIG. 2C, the packet processor based bridge-architecture is coupled via a serial interconnect to a switch-architecture. The switch-architecture is a non-blocking switch that provides serial, high-speed, point-to-point connections in a cut-thorough mode between multiple devices and the processor. The switch-architecture may be implemented through merchant switches such as, for example, the GigPCI-Express switch, model 6468—8-port Gigabit Ethernet switch by DSS networks, or the MB8AA3020 20-port, 10 Gbps Ethernet (10 GbE) switch IC by Fujitsu Microelectronics America.

In FIGS. 5B and 5C there is illustrated a multi core embodiment of the Ether PC of the present invention with dual cores in which one of the cores is dedicated for communication applications. In this illustrated multi core embodiment, there is separate program space and data space. The cores can access any space by switching between the two. The Data to I/O is switched. The switch allows a memory request originating at an execution core to be switched to one or more external memory resources thereby overcoming memory bandwidth limitations inherent in conventional architectures where memory requests traverse a single data communication bus to and fro from a single system memory resource.

Another embodiment of the present invention contemplates a switching architecture implementation using the packet processor illustrated in FIGS. 2C and 5C. One of the features of such an embodiment is combined bridge-switch architecture located on the processor die and capable of providing the services described above.

Another embodiment contemplates integrating the architectures disclosed in previously identified co-pending application entitled "Telecommunication and Computing Platforms with Serial Packet Switched Integrated Memory Access Technology," into a single die/processor package.

In one embodiment illustrated in FIG. 3A, the packet protocol processor allows line speed QoS packet switching which is utilized to implement a simple token based communication in Ethernet between the processor and the devices in the system as set forth in previously identified co-pending application entitled "Enhanced Ethernet Protocol for Shortened Data Frames Within a Constrained Neighborhood Based on Unique ID." In this embodiment, the packetized communication over the bridge-switch-architecture is further specialized to speed-up sustained, point-to-point communications in the system. Each packet is provided with a source address (SA) and destination address (DA) and E-type like VLAN Tag for use in negotiating a unique token between end points on a communication link.

The E-type extensions may be, for example, Request for UNIQUE ID or TOKEN GRANT; data communication with the granted token and request to retire the TOKEN. Once the TOKEN has been granted, the SA and DA fields are used along with the E-type to pass short date. This may also be extended to include large blocks of data for STA, and SAS. In other embodiments, once a UNIQUE ID is negotiated between end-points and an intermediate node connecting these end-points, a fixed frame size is used to endow the link with predictable performance in transferring the fixed frame and consequently meet various latency requirements. For example, the SA/DA pair could be used to transmit 12 bytes of data, 2 E-Type bytes and 2 bytes TAG.

One of the embodiments to go along with multiple extended memories is multiple caches. In one embodiment, the processor card is provided with two switchable caches (like two register files for threads). On a cache miss, the processor switches over from the first cache to the second cache to begin processing a second program thread associated with the second case. In another embodiment, there could be a cache per extended memory.

In one embodiment, control is provided as part of the extended Ethernet protocol. This could also "add" to the CPU wait cycles if more than one processor requests the same block of memory. In a sense that would be a component of latency because the processor and the instructions scheduled for execution cannot distinguish between data locality dependent latency (speed of access and transfer) versus concurrency control based data access "gap" because barring data mirroring concurrent access is not instantaneous access.

Figure 4:
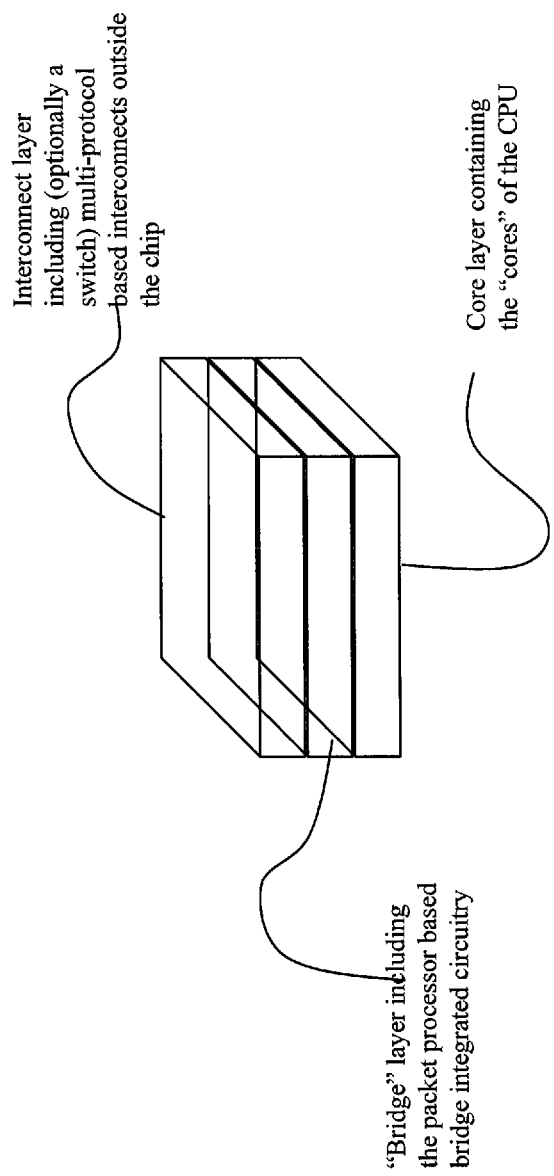
FIG. 4 illustrates an embodiment of the present invention incorporated into a three-dimensional chip architecture.

In another embodiment, the memory modules of the illustration of FIGS. 2A and 2C comprise four Channel Fully-Buffered Dual Inline Memory Modules (FB-DIMM)s. FB-DIMM memory uses a bi-directional serial memory bus which passes through each memory module. The FB-DIMM transmits memory data in packets, precisely controlled by the AMB (Advanced Memory Buffer) chips built into each FB-DIMM module. In one embodiment of the present invention, the four Channel FB-DIMMS are connected to 40 G lines and terminated to FB-DIMM lanes. The AMB is 10 lanes serial south bound and 14 lanes serial North bound. In terms of the AMC card of FIG. 2C, the AMB is configured to be a 16 Lane Fabric having less than 5 Gbps total bandwidth coming out of the memory Controller of FIG. 4A. Using commercial chips, such as for example, the Fujitsu Axel X (by Fujitsu Microelectronics America) which can provide speeds of 10 G per lane, the aforementioned requirements can be met by the use of a single 10 G lane. Additional bandwidth in excess of than 5 Gbps is provided by the use of multiple AMCs or multiple lanes. It will be appreciated that there is Serialization and De-serialization on the DRAM end and serialization and de-serialization on the processor side. The latency penalty of the Switch, and any overhead in the serialization and de-serialization methods due to the serialization/de-serialization can be overcome in the manner set forth in the succeeding paragraphs.

In one embodiment, latency and contention/concurrency issues within the Ethernet switched fabric are resolved within a "contained network." Deterministic latency (tolerable margin jitter) through a "well contained network" (such as the packaging arrangement as described herein) is indeed possible. Switching priority, dedicated ports (a pseudo port to dedicated memory ports, communicating over Unique IDs between these ports and other techniques disclosed in the previously identified co-pending application entitled "Enhanced Ethernet Protocol for Shortened Data Frames Within a Constrained Neighborhood Based on Unique ID," are advantageously utilized to overcome latency and contention/concurrency related issues.

In another embodiment, the present invention can be adapted to support a mesh architecture of processor-to-processor interconnection via the switched Ethernet fabric. In one embodiment, N-1 connections are made to each node with each node have 2 connections to all other nodes. In other embodiments, different combinations of number of Ethernet ports/card, number of ports/switch and number of switches/packaging arrangement can provide for various combinations of connections per node.

In another embodiment, the bit stream protocol processor enables prioritized switching. In conjunction with the modular and scalable three-dimensional chip architecture of the previous paragraph, the present invention allows the creation of an N-layered hierarchy of multiprocessors where N is both hardware independent and dynamically selectable by altering the prioritization afforded to different subsets of processors in the bit stream protocol processor mediated fabric. This embodiment enables the chip architecture to be configured as a shared memory model machine as well as a message passing model multiprocessor machine. Alternately, the architecture in accordance with one embodiment of the present invention may be configured as a server, a storage area network controller, a high performance network node in a grid computing based model, or a switch/router in a telecommunication network. It will be recognized that the same basic machine may be programmatically or manually altered into one or more of the aforementioned special purpose machines as and when desired.

Finally, while the present invention has been described with reference to certain embodiments, those skilled in the art should appreciate that they can readily use the disclosed conception and specific embodiments as a basis for designing or modifying other structures for carrying out the same purposes of the present invention without departing from the spirit and scope of the invention as defined by the appended claims.

For purposes of interpreting the claims for the present invention, it is expressly intended that the provisions of Section 112, sixth paragraph of 35 U.S.C. are not to be invoked unless the specific terms "means for" or "step for" are recited in the subject claim.

What is claimed is:

1. An apparatus implementing a computing and communication chip architecture for integrated circuitry, comprising:
   at least a pair of processor cores; and,
   at least a pair of external ports; and
   at least one switch operably connected to the said pair of processor cores and the said pair of external ports; and,
   the said pair of processor cores and the said pair of external ports and the said switch are collocated on the semiconductor die package; wherein,
   the said pair of processor cores are adopted to send and receive serial communication protocol data packets using a parallel bus to programmable serial interface converter; and,
   the said pair of processor cores is adopted to communicate with external devices using packetized serial communication; and,
   the said switch is adopted for packetized serial communication among the said pair of processor cores and the said pair of external ports; and,
   the said switch is adopted to provide translation between multiple serialized protocols; and, each of the said pair of external ports is adopted to provide a predefined serial communications interface.

2. The apparatus of claim 1, wherein,
the said switch is collocated on the said pair of processor cores.

3. The apparatus of claim 1, wherein,
the serial communication protocols supported by the said switch for translation is programmable by an external device, via one of the said pair of external ports.

4. The apparatus of claim 3 wherein,
the said pair of processor cores are adopted to provide two different packetized serial communication protocols for communicating with external devices connected to the said pair of external ports.

5. An apparatus of claim 4 wherein,
at least one of the two different packetized serial communication protocols for communicating with external devices is PCI express.

6. An apparatus of claim 4 wherein,
at least one of the two different packetized serial communication protocols for communicating with external devices is Ethernet.

7. An apparatus of claim 4 wherein,
at least one of the two different packetized serial communication protocols for communicating with external devices is Serial Rapid IO.

8. An apparatus of claim 4 wherein,
at least one of the two different packetized serial communication protocols for communicating with external devices is Infiniband.

9. An apparatus of claim 3 wherein,
each of the said external ports is connected to a different memory device, and,
the said switch is adopted to switch the memory data read or data write access requests from the said pair of processor cores between the said external ports, such that the data from the said pair of processor cores is written to the accessed memory device and the read data from accessed memory device is transferred to the said pair of processor cores.

* * * * *